(12) United States Patent
Baumgartner et al.

(10) Patent No.: US 11,520,018 B2
(45) Date of Patent: Dec. 6, 2022

(54) OPTICAL SYSTEM, IN PARTICULAR A LIDAR SYSTEM, AND VEHICLE

(71) Applicant: Robert Bosch GmbH, Stuttgart (DE)

(72) Inventors: Andreas Baumgartner, Auenstein (DE); Sina Fella, Neuenstadt (DE); Stefan Kuntz, Flein (DE); Wolfgang Welsch, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 16/860,328

(22) Filed: Apr. 28, 2020

(65) Prior Publication Data

US 2020/0348398 A1 Nov. 5, 2020

(30) Foreign Application Priority Data

May 3, 2019 (DE) .......................... 102019206316.0

(51) Int. Cl.
*G01S 7/481* (2006.01)
*G01S 17/42* (2006.01)
(Continued)

(52) U.S. Cl.
CPC .......... *G01S 7/4817* (2013.01); *G01S 7/4815* (2013.01); *G01S 7/4816* (2013.01); *G01S 7/499* (2013.01);
(Continued)

(58) Field of Classification Search
CPC .... G01S 7/4817; G01S 7/4815; G01S 7/4816; G01S 7/499; G01S 17/06; G01S 17/42;
(Continued)

(56) References Cited

U.S. PATENT DOCUMENTS

2008/0316026 A1* 12/2008 Yenisch .................. G01S 17/87
340/555
2013/0230798 A1* 9/2013 Maeda ................ G03F 7/70641
430/30
(Continued)

FOREIGN PATENT DOCUMENTS

DE 2712199 81 9/1978
DE 4133359 A1 4/1993
(Continued)

*Primary Examiner* — Jared Walker
(74) *Attorney, Agent, or Firm* — Norton Rose Fulbright US LLP; Gerard Messina

(57) ABSTRACT

An optical system, in particular a LiDAR system, is provided, including at least one optical transmitter and at least one optical detector as well as a data processing unit. The optical transmitter is configured to emit a scanning light beam into the surroundings to scan same for surroundings objects. The optical detector is configured to receive a reflected light beam from the surroundings. The optical system is configured to a) detect and differentiate reflected light beams in at least two wavelength ranges and/or b) detect and differentiate reflected light beams having at least two polarization directions. The optical system is configured with the aid of the data processing unit to determine the surface properties of the scanned surroundings objects from the differences between the reflected light beams and the emitted scanning light beams.

17 Claims, 2 Drawing Sheets

(51) Int. Cl.
*G01S 7/499* (2006.01)
*G01S 17/931* (2020.01)
*G01S 17/06* (2006.01)

(52) U.S. Cl.
CPC .............. *G01S 17/06* (2013.01); *G01S 17/42* (2013.01); *G01S 17/931* (2020.01)

(58) Field of Classification Search
CPC ...... G01S 17/931; G01S 17/88; G01S 7/4802; G01S 7/4818; G01S 7/484; G01S 7/486; G01S 7/4911; G01S 7/4912
See application file for complete search history.

(56) References Cited

U.S. PATENT DOCUMENTS

| | | | | |
|---|---|---|---|---|
| 2014/0240161 | A1* | 8/2014 | Davidson | H04K 3/00 356/28 |
| 2015/0309163 | A1* | 10/2015 | Van Der Velde | G01S 7/003 250/214.1 |
| 2015/0355326 | A1* | 12/2015 | Smith | G01S 7/4868 356/5.01 |
| 2016/0041266 | A1* | 2/2016 | Smits | G01S 17/66 356/5.01 |
| 2017/0155225 | A1* | 6/2017 | Villeneuve | H01S 3/06758 |
| 2017/0293166 | A1* | 10/2017 | Rheme | G02F 1/0136 |
| 2017/0307736 | A1* | 10/2017 | Donovan | G01S 7/497 |
| 2018/0106901 | A1* | 4/2018 | Frederiksen | G01S 7/4816 |
| 2018/0329065 | A1* | 11/2018 | Pacala | G02B 27/0955 |
| 2018/0372850 | A1* | 12/2018 | Frederiksen | G01S 7/4818 |
| 2019/0113622 | A1* | 4/2019 | Wu | G01S 17/42 |
| 2019/0227175 | A1* | 7/2019 | Steinberg | G01S 17/93 |
| 2019/0361100 | A1* | 11/2019 | Abari | G01S 7/497 |

FOREIGN PATENT DOCUMENTS

| | | |
|---|---|---|
| DE | 4300896 C1 | 4/1994 |
| DE | 19506550 A1 | 8/1996 |
| DE | 102007004609 A1 | 8/2007 |
| DE | 102016009926 A1 | 2/2017 |
| DE | 102016216928 A1 | 3/2018 |
| WO | 2018138138 A1 | 8/2018 |

* cited by examiner

OPTICAL SYSTEM, IN PARTICULAR A LIDAR SYSTEM, AND VEHICLE

CROSS REFERENCE

The present application claims the benefit under 35 U.S.C. § 119 of German Patent Application No. 102019206316.0 filed on May 3, 2019, which is expressly incorporated herein by reference in its entirety.

FIELD

The present invention relates to an optical system, in particular a LiDAR system, including at least one optical transmitter and at least one optical detector as well as a data processing unit, the optical transmitter being configured to transmit a scanning light beam into the surroundings to scan same for surroundings objects and the optical detector being configured to receive a reflected light beam from the surroundings. The present invention also relates to a vehicle including an optical system of this type.

BACKGROUND INFORMATION

To ensure safe, highly automated driving, the surroundings must be reliably detected. For this purpose, a combination of cameras and infrared LiDAR (light detection and ranging) is, for example, used according to the related art. In addition, the friction coefficient of the road to be traveled must be known as accurately as possible to allow for automated driving that is adapted to the surrounding conditions. The friction coefficient is in particular influenced by "intermediate media" present on the road (i.e., the media between the asphalt and the tires), such as for example water, snow, ice, leaves or oil. These media may be detected by different sensors (for example camera, sound, ultrasonic, or optically in the infrared range).

Within the scope of this present description, the terms "light" and "optical" are to be understood broadly and are in particular not limited to visible light, but relate in particular also to infrared light or other (in particular adjacent) wavelength ranges.

Optical sensors in the near-infrared range (approximately 800 nm to 3,000 nm) evaluate the diffuse and/or directed reflection of actively transmitted light of multiple wavelength(s) (ranges). These wavelength(s) (ranges) are differentiated in that their absorption lines of water in all physical conditions (liquid, ice-covered, snow-covered, or mixed conditions) are pronounced at a different intensity. This makes it possible to differentiate dry roads from non-dry roads, to categorize individual intermediate media as "road conditions," and to even determine the layer thickness of the intermediate medium. Intensities and intensity ratios are in particular evaluated for this purpose, either with the aid of comparison, threshold values, or machine learning methods. The thus resulting determination of the road condition is referred to in the following as an "algorithm." Sensors of this type are described in German Patent Nos. DE 2712199, DE 4133359, and DE 19506550, for example.

Alternatively or also additionally, the polarization degree of the light may be used to determine the road condition, as described in German Patent No. DE 4300896, for example. The polarization direction may be influenced by using polarization filters or already prepolarized light sources, such as for example lasers.

German Patent Application No. DE 10 2016 216 928 A1 describes a device for determining a structure of a roadway surface with the aid of a lighting device that includes a supercontinuum laser source and a micromirror device, the supercontinuum laser source being designed to generate initial light beams having wavelengths in the infrared spectrum range. The micromirror device is designed to deflect the generated initial light beams for scanning at least one predefined solid angle range. A detection device is designed to detect response light beams in the infrared spectral range generated by incident initial light beams on a roadway surface in the predefined solid angle range.

This means that highly automated driving according to the related art requires two sensor systems that work separately using visible light or light in the infrared range and are evaluated independently of one another, on the one hand, to detect surroundings objects and, on the other hand, to determine the properties of the roadway surface.

SUMMARY

According to the present invention, an optical system is provided. In an example embodiment of the present invention, the optical system is configured to
a) detect and differentiate reflected light beams in at least two wavelength ranges and/or
b) detect and differentiate reflected light beams having at least two polarization directions,
so that the optical system is configured with the aid of the data processing unit to determine the position of scanned surroundings objects as well as the surface properties of the scanned surroundings objects from the differences between the reflected light beams and the emitted scanning light beams.

Within the scope of this present invention, a hybrid of LiDAR and an optical road condition sensor is thus provided, in which a LiDAR may be used to simultaneously detect the road condition.

With the aid of the combination presented here, the function of the LiDAR may be massively expanded, thus making it possible to also ascertain information about the road condition with the aid of the LiDAR. This is made possible in that the LiDAR evaluates the information from the reflected light beams of multiple wavelengths or polarization directions.

The term "reflected light beams" includes in this case the reflected-back light beams (for example by more or less smooth surfaces) as well as scattered-back light (for example of dirty surfaces, liquid films, or irregular surfaces such as leaves). The received light is generally a mix of reflected and scattered light.

Instantaneously, a LiDAR typically transmits only a narrow wavelength range having a defined polarization. It is, however, not possible to detect the road condition via the scattered-back intensity of such a wavelength range by itself, since illuminated objects/illuminated road sections as well as the intermediate medium influence the signal. Instead, either spectrally resolved information, i.e., from at least two wavelength ranges, or information that is a function of the polarization direction, is necessary.

Within the scope of the description herein, the term "wavelength range" may describe a narrow wavelength range, for example of a laser, or a broad wavelength range of a supercontinuum laser or a broadband light source. Different wavelength ranges refer to such ranges that differ at least in one part of the included wavelengths in each case.

In the context of the present invention, a "surface property" may refer to the presence of water, oil, or other liquids, for example. By evaluating the intensities detected as a function of the wavelength or polarization in a spot on the road, it is possible to identify, whether this spot is covered by water in any arbitrary physical condition. Moreover, additional information about the objects may also be included. Living organisms (for example animals, trees) contain a lot of water, which is why their optical spectra also show typical absorption lines. Other problematic objects, such as leaves or an extensively soiled roadway (for example by oil), may in principle also be detected. The determination of one or more surface properties therefore not only makes it possible to determine the roadway properties (wet, dirty, etc.), but in principal it also makes it possible to identify surroundings objects (vehicles, vegetation, animals, roadway boundaries, etc.) and their (surface) properties.

In one specific example embodiment of the present invention, the optical system includes at least two optical transmitters that transmit scanning light beams in different wavelength ranges. The optical transmitters may then be spatially separated and emit their scanning light beams simultaneously in different directions. In this case, the optical system may also include multiple optical detectors that are provided in corresponding wavelength ranges for detecting the corresponding reflected light beams. Alternatively, a single detector may also be provided that detects the reflected light beams from different optical transmitters at different time segments (for example with the aid of a rotating bandpass filter). Depending on the design, this, however, requires additional computing time under certain circumstances to combine the surroundings scans in different wavelength ranges that are "shifted" chronologically or spatially. Another example includes coupling multiple light sources of different wavelength ranges in optical fibers that are combined to form one output fiber.

In a further specific embodiment of the present invention, an example optical transmitter includes at least two light sources that emit scanning light beams in different wavelength ranges and are preferably situated on one joint semiconductor chip. One problem with physically offset light sources is that the generated images are typically offset by the LiDAR with regard to one another; this must be corrected arithmetically afterwards and the images must be put on top of one another. For this reason, specific embodiments are preferred, in which only a single light source is present or in which light sources are present that are spatially very close to one another. Minor spatial deviations may be compensated for by optical elements such as lenses or lens systems, for example. One example of the detection principle, which is a function of the wavelength, is a laser, in which different resonators are implemented on one semiconductor chip, it being possible to electrically switch back and forth between these resonators.

In one preferred specific embodiment of the present invention, at least one optical sensor includes a broadband light source. Such a broadband light source may be, for example, a supercontinuum laser, i.e., a laser having an extremely widened optical spectrum (for example having a half-width of one octave in the wavelength or more). In this case, multiple optical detectors having different bandpass filters may be used in order to use different smaller wavelength ranges from the reflected light beam having an originally broad wavelength range.

In a further specific embodiment of the present invention, the optical system includes at least two optical detectors that include bandpass filters, each being permeable in different wavelength ranges. This specific embodiment is preferably combined with a broadband light source as the optical transmitter to facilitate signal processing. The optical detectors are then preferably situated spatially close to one another, i.e., directly adjacent to one another.

In one specific embodiment of the present invention, at least two optical transmitters are configured to emit scanning light beams having different polarization directions. This may be achieved with the aid of different polarization filters in the optical transmitters, for example, or by using prepolarized light sources, such as for example appropriately situated lasers.

In a further specific embodiment of the present invention, the optical system includes at least two optical detectors that include polarization filters, each being permeable for different polarization directions. This may alternatively be achieved when detecting the road condition as a function of polarization, for example, with the aid of polarization filters, which vary over time (for example a rotating filter wheel or a Pockels cell), using a single optical detector.

In one specific embodiment of the present invention, the optical system is configured to emit and/or detect at a given time segment during operation only one scanning light beam of the at least two scanning light beams having two different wavelength ranges and/or having two different polarization directions in each case. This approach allows for relatively compact or cost-effective implementations. For example, light from multiple light sources of different wavelength ranges may be coupled in optical fibers, which are combined to form one output fiber, only one light source being active, however, at any given point in time. Additionally or alternatively, an optical detector having a variable bandpass filter may be used.

In a further specific embodiment of the present invention, the optical system is configured to emit during operation at least two scanning light beams having two different wavelength ranges and/or having two different polarization directions in different directions and to detect same from different directions in each case. The scanning light beams or reflected light beams may then be emitted in different directions with the aid of a rotating mirror system, for example, or received from different directions (for example at an approximately 180° relative angle).

According to the present invention, a vehicle is moreover provided, including at least one optical system according to one of the preceding specific embodiments, the optical system being installed in the vehicle in such a way that the at least one scanning light beam scans the surroundings of the vehicle during operation of the optical system. A vehicle of this type facilitates in particular safe highly automated driving, without the need of two separate optical systems for detecting the surroundings and for scanning the surfaces.

Advantageous refinements of the present invention are described herein.

BRIEF DESCRIPTION OF THE DRAWINGS

Exemplary embodiments of the present invention are explained in greater detail below based on the figures.

DETAILED DESCRIPTION OF EXAMPLE EMBODIMENTS

Figure 1:
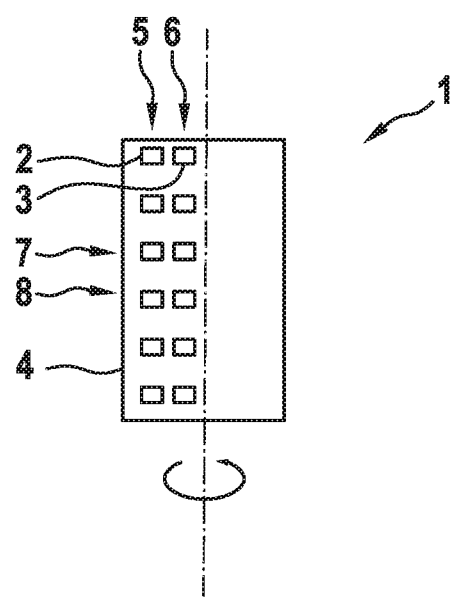
FIG. 1 shows a part of one specific embodiment of an optical system according to the present invention.

One preferred specific embodiment of an optical system 1 according to the present invention is shown in FIG. 1. Here, multiple light sources 2, 3 (for example, lasers) of an optical transmitter 4 are situated within at least one column 5, 6 to obtain an image. Within each column 5, light sources 2 emit in the same wavelength range and/or in the same polarization direction. This correspondingly applies to column 6 and light sources 3 for another wavelength range and/or for another polarization direction. For example, the lasers of light sources 2 may have a higher wavelength range than the lasers of light sources 3.

Within the scope of this specific embodiment, light sources 2, 3 are situated next to one another in rows 7, 8 having different wavelength ranges and/or different polarization directions. It is also possible to use more or fewer rows 7, 8 or more columns 5, 6 (having more than two different types of light sources 2, 3). Alternatively, the use of one or multiple broadband light sources is also possible.

If this system now rotates as indicated (or a mirror positioned in front of it, see FIG. 3), the surroundings are scanned elliptically. In the related art, this takes place at the same wavelength or in the same polarization direction (or without a preferred polarization direction). By using different wavelengths or polarization directions, an image is obtained for each wavelength or polarization direction and it is possible to carry out a differentiation of different road conditions and surroundings objects, as described above. The selection of suitable lenses makes it possible in this case that the projected points are close enough on the scanned surroundings objects even for different wavelengths (see also FIG. 3).

Figure 2:
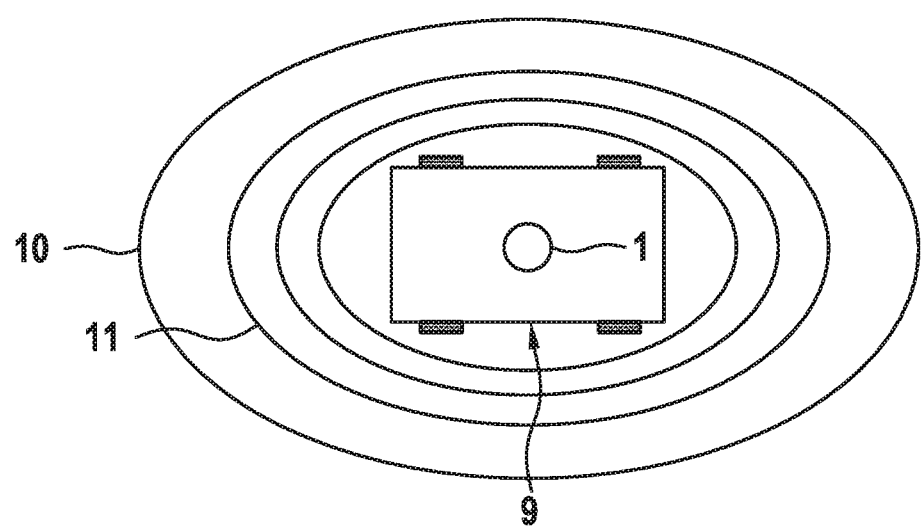
FIG. 2 shows one specific embodiment of a vehicle according to the present invention, including the specific embodiment according to FIG. 1.

FIG. 2 shows one specific embodiment of a vehicle 9 according to the present invention, including an optical system according to the specific embodiment according to FIG. 1. In the case of rotation of optical transmitter 4 or of a mirror positioned in front of it, the surroundings are scanned elliptically. This is indicated by ellipses 10, 11. Ellipse 10 corresponds, for example, to row 7 and ellipse 11 to row 8 in FIG. 1.

Figure 3:
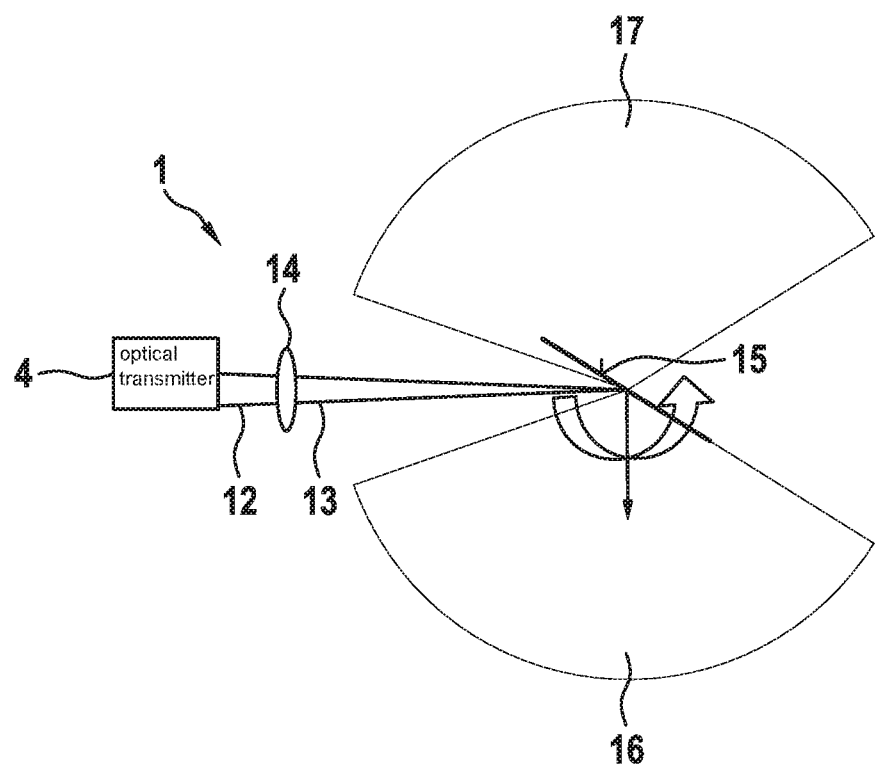
FIG. 3 shows a view of a second specific embodiment of an optical system according to the present invention.

FIG. 3 shows a slightly modified optical system 1, including an optical transmitter 4 viewed from above. At least one optical detector may be installed in the same housing as optical transmitter 4 or situated independently therefrom (this also applies for the previous specific embodiments), which is not illustrated here, however, for the sake of clarity.

Optical transmitter 4 is configured to emit multiple scanning light beams along a first beam path 12 and a second beam path 13 into the surroundings (both beam paths 12, 13 may also represent columns 5, 6 of light sources 2, 3 as in FIG. 1).

An optical element 14 (for example a lens or a lens system) is situated in beam paths 12, 13 for beam formation. Subsequently, the scanning light beams hit a mirror surface 15 that deflects the light beam to scan the surroundings. By way of example, the optical system in the present case has only two separate fields of vision 16, 17 of 140° each, for example. Specific embodiments having continuous fields of vision may, however, also be provided.

By selecting a suitable optical element 14 and situating light sources 2, 3, which have different wavelengths and/or polarization directions, close to one another, it is possible in this case that the projected points (for example for each row 7, 8) are also close enough to one another for different wavelength ranges/polarization directions and a scanning for the same location takes place simultaneously (for example on an ellipse 10, 11 as in FIG. 2).

The illustrated specific embodiments relate in particular to the approaches involving different light sources 2, 3. It is, however, similarly possible to use one broadband light source and different detectors for different wavelength ranges and/or polarization directions. Alternatively, it is also possible to use only one broadband light source and one detector having a rotating filter wheel or a Pockels cell, in that on the detector side different wavelength ranges and/or polarization directions are detected at different points in time.

What is claimed is:

1. An optical system, comprising:
   at least one optical transmitter configured to emit scanning light beams into surroundings to scan the surroundings for surroundings objects;
   at least one optical detector configured to receive reflected light beams from the surroundings; and
   a data processing unit;
   wherein:
   the optical system is configured to a) detect and differentiate reflected light beams in at least two wavelength ranges and/or b) detect and differentiate reflected light beams having at least two polarization directions; and
   the data processing unit is configured to, based on the detection and differentiation and from differences between the reflected light beams and the emitted scanning light beams, determine both (a) a position of scanned surroundings objects and (b) surface properties including a water characteristic of the scanned surroundings objects.

2. The optical system as recited in claim 1, wherein the optical system is a LiDAR system.

3. The optical system as recited in claim 1, wherein the at least one optical transmitter includes at least two optical transmitters that emit the scanning light beams in different wavelength ranges.

4. The optical system as recited in claim 1, wherein the at least one optical transmitter include an optical transmitter including at least two light sources that emit scanning light beams in different wavelength ranges and are on one shared semiconductor chip.

5. The optical system as recited in claim 1, wherein at least one of the at least one optical transmitter includes a broadband light source.

6. The optical system as recited in claim 1, wherein the at least one optical transmitter includes at least two optical detectors that include bandpass filters, each being permeable in different wavelength ranges.

7. The optical system as recited in claim 1, wherein the at least one optical transmitter includes at least two optical transmitters configured to emit scanning light beams having different polarization directions.

8. The optical system as recited in claim 1, wherein the at least one optical detector includes at least two optical detectors that include polarization filters, each being permeable for different polarization directions.

9. The optical system as recited in claim 1, wherein the optical system is configured to emit and/or detect at a given time segment during operation, only one scanning light beam of the at least two scanning light beams having two different wavelength ranges and/or having two different polarization directions.

10. The optical system as recited in claim 1, wherein the optical system is configured to emit during operation, at least two scanning light beams having two different wavelength ranges and/or having two different polarization directions in different directions and to detect reflected light from different directions in each case.

11. A vehicle, comprising:
optical system, including:
- at least one optical transmitter configured to emit scanning light beams into surroundings to scan the surroundings for surroundings objects;
- at least one optical detector configured to receive reflected light beams from the surroundings; and
- a data processing unit;

wherein:
- the optical system is configured to a) detect and differentiate reflected light beams in at least two wavelength ranges and/or b) detect and differentiate reflected light beams having at least two polarization directions;
- the data processing unit is configured to, based on the detection and differentiation and from differences between the reflected light beams and the emitted scanning light beams, determine both (a) a position of scanned surroundings objects in an area circumferentially surrounding the vehicle and (b) surface properties including a water characteristic of the scanned surroundings objects; and
- the optical system is installed in the vehicle in such a way that the scanning light beams scan the area surrounding the vehicle during operation of the optical system.

12. The vehicle as recited in claim 11, wherein at least one optical transmitter a plurality of optical transmitters arranged in a two-dimensional array of columns and rows such that in each of the columns, all of the optical transmitters that are arranged in the respective column emit at a same wavelength, and adjacent ones of the optical transmitters that are in a single one of the rows emit at different wavelengths than each other.

13. The vehicle as recited in claim 11, wherein at least one optical transmitter a plurality of optical transmitters arranged in a two-dimensional array of columns and rows such that in each of the columns, all of the optical transmitters that are arranged in the respective column emit at a same polarization, and adjacent ones of the optical transmitters that are in a single one of the rows emit at different polarizations than each other.

14. The optical system as recited in claim 1, wherein at least one optical transmitter a plurality of optical transmitters arranged in a two-dimensional array of columns and rows such that in each of the columns, all of the optical transmitters that are arranged in the respective column emit at a same wavelength, and adjacent ones of the optical transmitters that are in a single one of the rows emit at different wavelengths than each other.

15. The optical system as recited in claim 1, wherein at least one optical transmitter a plurality of optical transmitters arranged in a two-dimensional array of columns and rows such that in each of the columns, all of the optical transmitters that are arranged in the respective column emit at a same polarization, and adjacent ones of the optical transmitters that are in a single one of the rows emit at different polarizations than each other.

16. The optical system as recited in claim 1, wherein the determined surface properties including the water characteristic of the scanned surrounding objects includes a determined wetness characteristic of a road surface.

17. The optical system as recited in claim 16, wherein the determined position of scanned objects is a determined position of surrounding objects including at least one of a vehicle, an animal, and a roadway barrier.

* * * * *